(12) United States Patent
Huber et al.

(10) Patent No.: US 11,001,460 B2
(45) Date of Patent: May 11, 2021

(54) METHOD AND TOOL CART FOR TRANSFERRING A TOOL COMPONENT

(71) Applicant: Multivac Sepp Haggenmüller SE & Co. KG, Wolfertschwenden (DE)

(72) Inventors: Michael Huber, Maria Steinbach (DE); Bernd Höpner, Kempten (DE); Sebastian Fackler, Ottobeuren (DE); Wolfgang Negele, Ottobeuren (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 16/662,375

(22) Filed: Oct. 24, 2019

(65) Prior Publication Data
US 2020/0130966 A1    Apr. 30, 2020

(30) Foreign Application Priority Data
Oct. 26, 2018  (DE) .................... 10 2018 218 410.0

(51) Int. Cl.
*B65G 67/04* (2006.01)
*B65G 69/00* (2006.01)
(Continued)

(52) U.S. Cl.
CPC .......... *B65G 67/04* (2013.01); *B65G 69/003* (2013.01); *B66F 7/085* (2013.01); *B66F 9/02* (2013.01);
(Continued)

(58) Field of Classification Search
CPC ....... B65G 67/04; B65G 69/003; B66F 7/085; B66F 9/02; B65B 59/04
See application file for complete search history.

(56) References Cited

U.S. PATENT DOCUMENTS 4,016,989 A * 4/1977 Furnari .................. A41H 43/02
                                                        414/344
4,056,207 A * 11/1977 Spilker .................. B21J 13/085
                                                        414/620

(Continued)

FOREIGN PATENT DOCUMENTS

DE         10209000 A1    9/2003
DE         10318835 A1    11/2004
(Continued)

*Primary Examiner* — Kaitlin S Joerger
(74) *Attorney, Agent, or Firm* — Brooks Kushman P.C.

(57) ABSTRACT

A tool cart having a frame, a lifting device for lifting the frame, a locking device to lock the tool cart horizontally relative to a work station or a packaging machine (collectively referred to below as the "packaging machine"), and a stop element that may engage with an underside of the packaging machine when lifted. The lifting device and locking device operate independently. A method for transferring a tool component including one or more of the steps of: aligning the tool cart relative to the packaging machine; locking the tool cart in position relative to the packaging machine; lifting a frame of the tool cart by way of a lifting device until the stop element engages an underside of the packaging machine; and transferring the tool component between the tool cart and the packaging machine may be included.

19 Claims, 7 Drawing Sheets

(51) Int. Cl.
*B66F 7/08* (2006.01)
*B66F 9/02* (2006.01)
(52) U.S. Cl.
CPC ............... *B65G 2814/0313* (2013.01); *B65G 2814/0382* (2013.01)

(56) References Cited

U.S. PATENT DOCUMENTS

| | | | | |
|---|---|---|---|---|
| 4,472,127 A * | 9/1984 | Cyriax | ................. | B29C 31/006 264/328.7 |
| 5,388,947 A * | 2/1995 | Ancel | ................. | B65G 69/003 14/71.1 |
| 5,940,953 A * | 8/1999 | Arends | ................. | B23Q 3/155 280/35 |
| 5,946,885 A * | 9/1999 | Focke | ................. | B65B 19/223 198/397.02 |
| 6,089,812 A * | 7/2000 | Junker | ................. | B23Q 7/1436 414/396 |
| 6,592,318 B2 * | 7/2003 | Aggarwal | ......... | H01L 21/67775 414/217.1 |
| 6,764,650 B2 | 7/2004 | Takahashi et al. | | |
| 8,303,234 B2 * | 11/2012 | Ezure | ..................... | B65G 65/00 414/396 |
| 8,616,824 B2 * | 12/2013 | Trebbi | .................... | B65B 59/04 414/331.06 |
| 8,857,135 B2 * | 10/2014 | Yasunaga | ............ | G07F 17/0092 53/562 |
| 9,248,929 B2 * | 2/2016 | Ehrmann | ................ | B29C 33/32 |
| 10,160,469 B2 * | 12/2018 | Grou | ........................ | B62B 3/02 |
| 10,427,434 B2 * | 10/2019 | Atwood | ................... | B41J 29/06 |
| 10,538,419 B2 * | 1/2020 | Cegueda | ............... | B66F 7/0625 |
| 2010/0058712 A1 * | 3/2010 | Prataiola | ................. | B65H 1/00 53/235 |
| 2015/0052848 A1 * | 2/2015 | Vine | ....................... | B62B 3/08 53/329 |
| 2019/0193887 A1 * | 6/2019 | Lau | ...................... | B65B 57/005 |

FOREIGN PATENT DOCUMENTS

| | | |
|---|---|---|
| EP | 1598275 A1 | 11/2005 |
| EP | 1878633 A2 | 1/2008 |

* cited by examiner

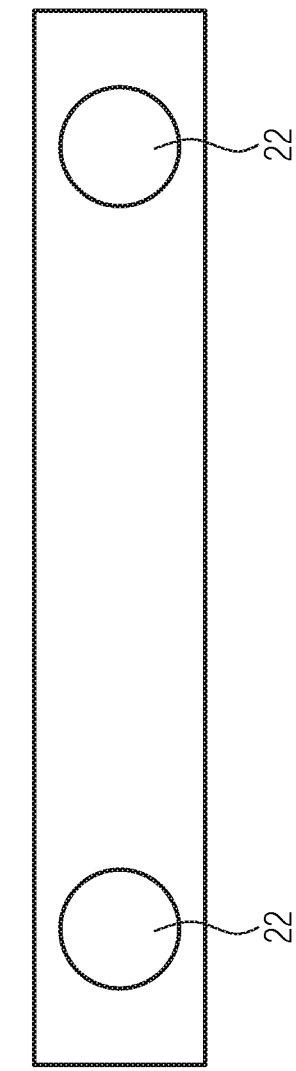

METHOD AND TOOL CART FOR TRANSFERRING A TOOL COMPONENT

CROSS-REFERENCE TO RELATED APPLICATIONS

This Application claims priority to German Patent Application No. 10 2018 218 410.0 filed on Oct. 26, 2018 to Michael Huber, Bernd Hopner, Sebastian Fackler and Wolfgang Negele, currently pending, the entire disclosure of which is incorporated herein by reference.

FIELD OF THE INVENTION

The invention relates to a method for transferring a tool component between a work station of a packaging machine and a tool cart that is configured to receive the tool component, and to a tool cart for receiving a tool component of a work station of a packaging machine.

BACKGROUND OF THE INVENTION

Packaging machines, especially when used for processing foods, are often set up in installation areas which have an inclination to prevent the accumulation of liquid and to ensure, for example, that cleaning fluids drain off in an orderly manner. Due to suitable apparatuses on the frame of the packaging machines, their conveyor lines are aligned horizontally. Accordingly, tool carts for receiving tool components from work stations of such packaging machines must also be appropriately aligned to the respective work station in order to be able to safely receive such tool components.

In order to ensure safe transfer of the tool component between the tool cart and the work station, the position of the tool cart relative to the work station during the transfer must be determined by suitable devices. A tool cart is known from EP 1 598 275 A1 which, during vertically alignment, i.e. when the cart is lifted vertically, is locked also in the horizontal direction in that positioning elements on the cart are inserted into corresponding positioning elements on the packaging machine. Since the final positioning occurs during the insertion of the positioning elements into one another, the tool cart disclosed therein is still displaceable while being lifted, which may be disadvantageous in terms of safety at work.

A tool cart which is adapted to be hooked in at the corresponding packaging machine is known From EP 1 878 633 A2. For this purpose, rollers of a chassis are first extended, so that a frame of the cart is lifted. The frame is then tilted while being lowered such that it hooks in at the packaging machine, so that the wheels lose contact with the installation surface when the chassis is further retracted. Here as well, the horizontal determination therefore takes place during the vertical motion of the tool cart, which can be disadvantageous, for example, for occupational safety when tilting, since it becomes more likely that the cart tips over.

SUMMARY OF THE INVENTION

It is therefore an object of the invention to provide a method for transferring a tool component between a work station of a packaging machine and a tool cart that may be configured to receive the tool component, as well as a tool cart for receiving a tool component of a work station of a packaging machine with which provides for increased safety at work.

The inventive method for transferring a tool component between a work station of a packaging machine and a tool cart that may be configured to receive the tool component comprises the steps of: horizontally aligning the tool cart relative to the work station and/or the packaging machine, horizontally locking the tool cart relative to the work station, and/or the packaging machine, vertically lifting a frame of the tool cart by way of a lifting device until a stop element of the tool cart abuts against an underside of the work station and/or the packaging machine, wherein the stop element abutting against the underside of the work station and/or the packaging machine aligns the tool cart vertically relative to the work station and/or the packaging machine, wherein the horizontal locking occurs independently of the vertical lifting, and transferring the tool component between the tool cart and the work station.

The packaging machine may be, for example, a thermoforming packaging machine, a tray sealer or generally a food processing packaging machine. A work station of such a packaging machine may be understood to be, for example, a sealing station configured to seal packagings. A work station may also be understood to be a forming station configured to form packaging components, or also a cutting station that may be configured to separate finished packagings.

A horizontal plane that runs parallel to the level plane may be regarded as being horizontal within the meaning of the present disclosure. A plane that runs parallel to an installation surface of a packaging machine or a work station may be likewise to be regarded as being horizontal within the meaning of the present disclosure. Horizontal alignment may be therefore to be understood within the meaning of the present disclosure such that the tool cart may be positioned relative to the work station and/or the packaging machine parallel to the aforementioned planes. Within the meaning of the present disclosure, horizontally locking may be understood such that locking prevents motions in these planes.

A stop element may be considered to be one or more structures of the tool cart which are made to engage with structures, such as an underside of the work station and/or the packaging machine, when the frame may be lifted vertically, and thereby ensure, for example, that the tool cart may be aligned relative to the work station and/or the packaging machine such that safe transfer of the tool component may be possible.

Due to the fact that the horizontal locking occurs independent of vertical lifting, safety at work may be increased because, for example, a horizontal motion may be prevented during the lifting motion. This may be of significance because vertical lifting may be usually done by machine elements, such as pneumatic cylinders or other drives, but the horizontal motion may be often performed by human operators who manually move the tool cart that may be, for example, mounted on rollers. By separating the manual and the mechanically driven motions from each other, safety at work may be increased because, for example, no manual horizontal displacement, which could, for example, cause the car to tip over, may be possible during the powered vertical lifting process. This would be dangerous especially with a tool cart loaded with tool components.

Accordingly, it may be advantageous to have the vertical lifting process be performed after the horizontal locking process has been executed. This allows for a particularly safe procedure.

It may be particularly advantageous to have lifting the frame result in roller elements arranged on the frame being lifted off an installation surface of the packaging machine. In this manner, the risk of rolling away in the lifted state may be further reduced.

It may be conceivable that the operation of the lifting device may be open-loop or closed-loop controlled such that the frame does not lower during the transfer of the tool component. In this way, the risk of the tool cart tilting, which may be given in particular when transferring the tool component by shifting the center of gravity, may be reduced.

The invention also relates to a tool cart for receiving a tool component of a work station of a packaging machine, wherein the tool cart comprises a frame, a lifting device for lifting the frame, as well as a locking device which may be configured to lock the tool cart horizontally relative to the work station and/or the packaging machine, wherein the lifting device and the locking device are operable independently of each other, wherein the tool cart further comprises a stop element which may be configured to engage with an underside of the work station and/or the packaging machine when the frame may be lifted.

Due to the fact that the lifting device may be operated independently of the locking device, safety at work may be increased because, for example, horizontal motions during the lifting process may be prevented. This may be of significance because vertical lifting may be usually done by machine elements, such as pneumatic cylinders or other drives, but the horizontal motion may be often performed by human operators who manually move the tool cart that may be, for example, mounted on rollers. By separating the manual and the mechanically driven motions from each other, the safety at work may be increased because, for example, no manual horizontal displacement, which could, for example, cause the car to tip over, may be possible during the powered vertical lifting. This would be dangerous especially with a tool cart loaded with tool components.

In one advantageous variant, the lifting device may be configured such that roller elements arranged on the frame are lifted from an installation surface of the packaging machine when the frame may be lifted. In this manner, the risk of rolling away in the lifted state may be further reduced.

It may be conceivable that the tool cart may be connected to a power supply of the work station and/or the packaging machine. In this way, neither a separate energy storage nor a long line to the next energy source must be provided in or on the tool cart. In particular, the tool cart may have a pneumatic port which may be connected to a compressed air supply of the work station and/or the packaging machine. Pneumatically operated drive elements are particularly advantageous in the food processing sector, because hygiene requirements are easier to comply with than, for example, with hydraulic devices.

It may be advantageous if lifting device comprises a cylinder. This represents a particularly simple variant for lifting. Furthermore, a wide variety of cylinder variants may be available on the market. As already mentioned, it may be advantageous to have the cylinder be a pneumatic cylinder.

In one further advantageous variant, the tool cart may comprise a rotating device which may be configured to rotate the tool component received by the tool cart about a horizontal and/or a vertical axis. In this way, for example, maintenance or repair work may be performed directly in the tool cart. The tool component would therefore, for example, not have to be transported to a workshop.

It may be further conceivable that the tool cart and/or the rotating station may be preferably adjustable without tools to adapt to different types of tool components or work stations. In this way, the same tool cart may be used on different machine types or different work station of the same packaging machine.

In a further variant, the tool cart may have an operating device that may be configured to operate the lifting device and that may only be operated by an operator using both hands. This may serve to further improve safety at work, since it reduces the risk of the user's limbs being pinched during powered lifting of the tool cart.

It may be conceivable that the locking device may be configured to engage with the work station and/or the packaging machine below the underside of the work station and/or the packaging machine, for example, with supports provided for carrying the work station and/or packaging machine between it and the installation area.

Furthermore, it may be conceivable that the tool cart may be configured such that the frame may be lifted in the horizontally locked state of the tool cart. This may also increase safety at work, as a horizontal lock may be ensured during the vertical lifting process. Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show:

FIG. 3 shows a schematic view of one embodiment an operating device of a tool cart method in accordance with the teachings of the present disclosure.

DETAILED DESCRIPTION OF THE INVENTION

Figure 1A:
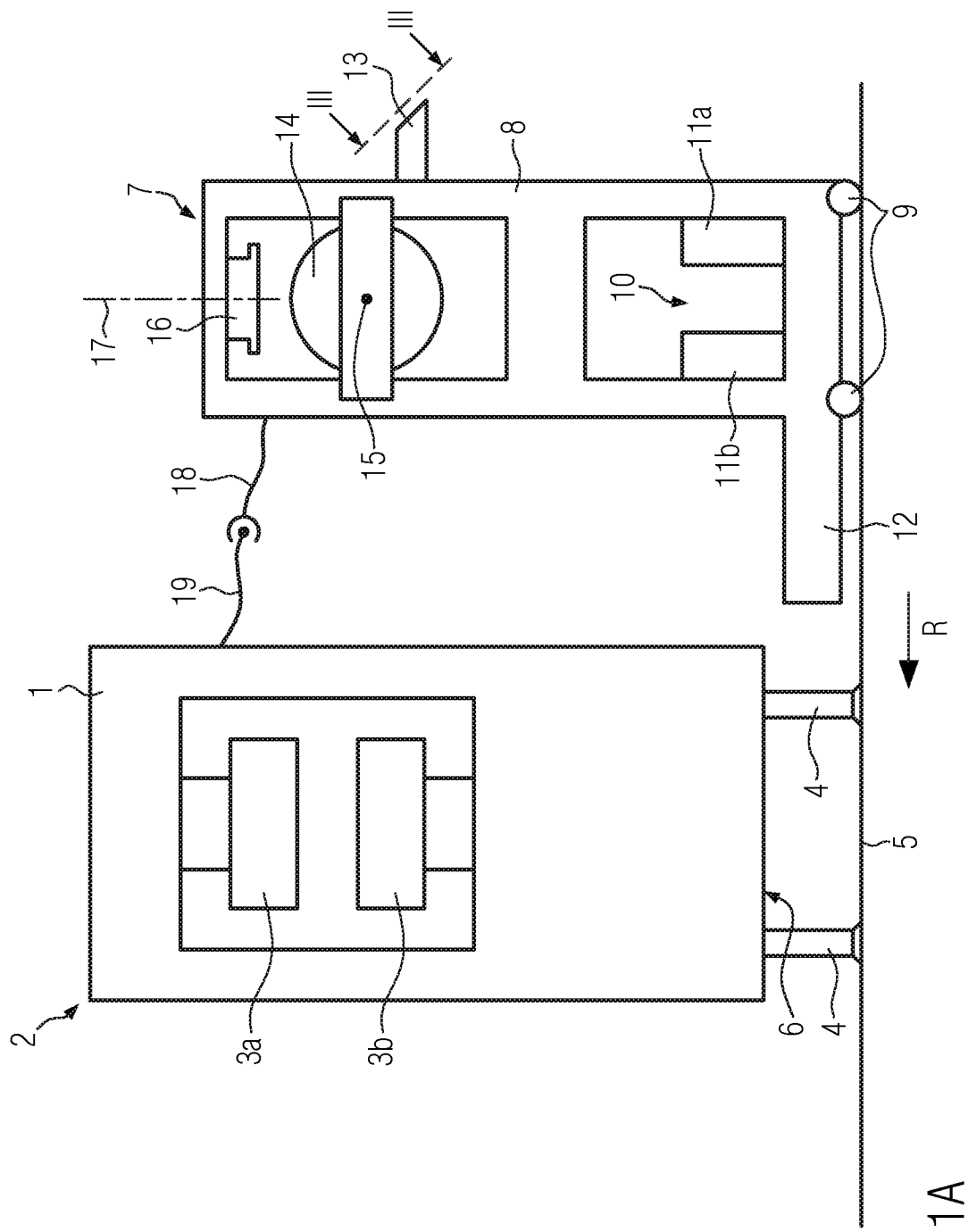
FIG. 1A is a schematic view of one embodiment of a packaging machine and one embodiment of a tool cart at one phase of an exemplary method in accordance with the teachings of the present disclosure.
Figure 1B:
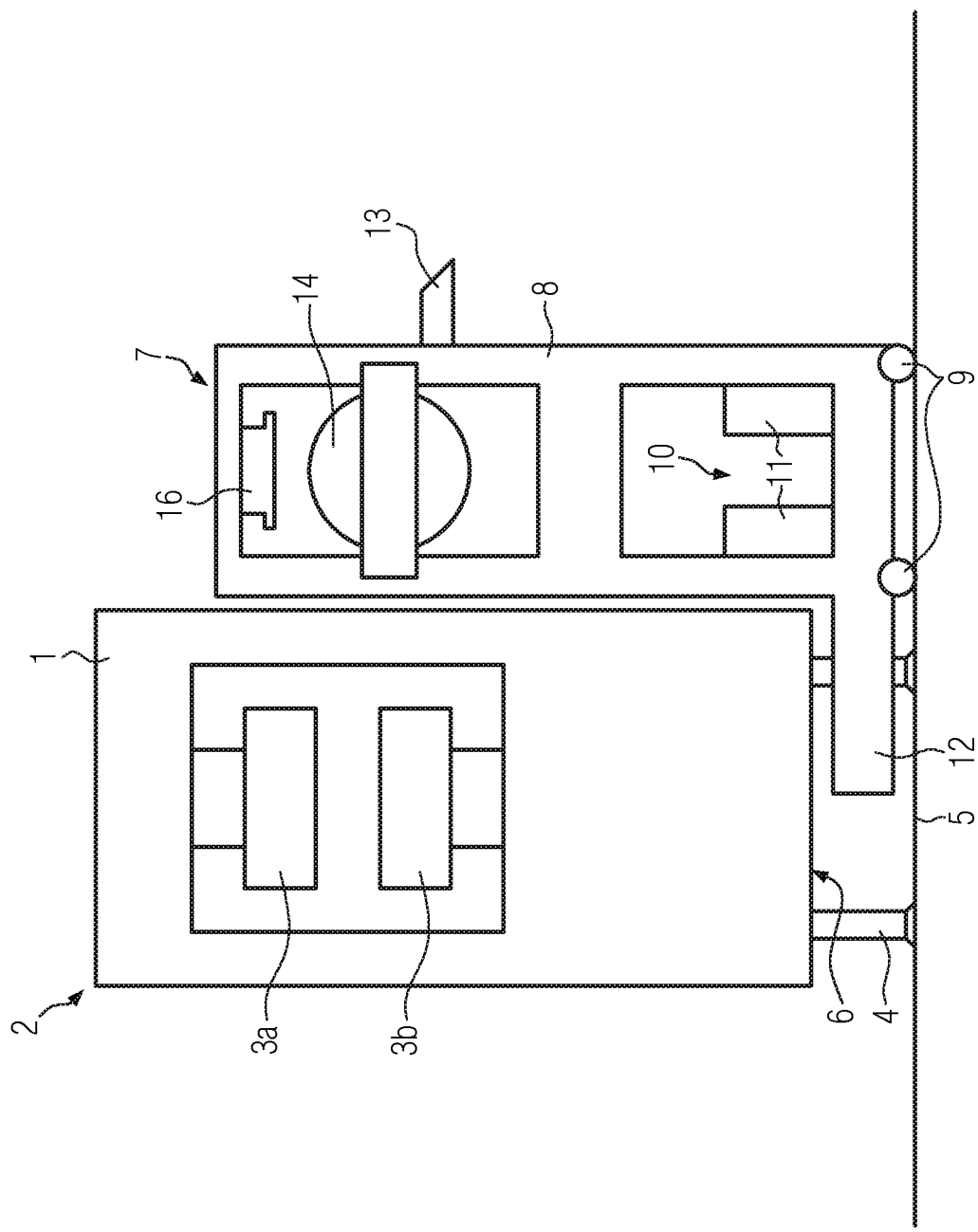
FIG. 1B is a schematic view of the embodiment of a packaging machine and the embodiment of a tool cart of FIG. 1A at another phase of an exemplary method.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1A shows schematically a work station 1 of a packaging machine 2. It may be a sealing station, like in the present embodiment. Work station 1 may comprise a first tool component 3a and a second tool component 3b. First tool component 3a may be, for example, an upper sealing tool. Second tool component 3a may be, for example, a lower sealing tool. Packaging machine 2 and/or work station 1 may be carried by supports 4 on an installation surface 5. Supports 4 may be individually adjustable in height to horizontally align packaging machine 2 and/or work station 1. Furthermore, supports 4 may provide for a spacing between installation surface 5 and an underside 6 of work station 1 and/or packaging machine 2.

FIG. 1A further shows a schematic view of a tool cart 7 according to one embodiment of the invention. Tool cart 7 may comprise a frame 8. Frame 8 may be mounted to be rollable on rolling elements 9. As a result, tool cart 7 may be rolled on installation surface 5. Tool cart 7 may further comprise a lifting device 10. It may be configured to lift frame 8 relative to installation surface 5. For this purpose, lifting device 10 may comprise a cylinder 11a. However, several cylinders 11 may be provided, like in the present embodiment. FIG. 1A shows, for example, a second cylinder 11b. Four cylinders 11 are particularly preferred. Each of cylinders 11 may be a pneumatic cylinder.

As can be seen in FIG. 1A, tool cart 7 may further comprise a stop element 12. Stop element 12 may be provided in the vicinity of installation surface 5, like in the present embodiment. It may additionally be dimensioned such that it is insertable into the space between underside 6 of work station 1 and/or packaging machine 2 and installation surface 5.

An operating device 13 may be provided on tool cart 7 for operating lifting device 10. Tool cart 7 may also comprise a first rotating device 14 configured to pivot a tool component 3a, 3b received by tool cart 7 about a horizontal axis 15. Furthermore, tool cart 7 may comprise a second rotating device 16. It may be adapted to pivot a tool component 3a, 3b received by tool cart 7 about a vertical axis 17. First and second rotating devices 14, 16 may also be combined to one rotating device.

Since tool cart 7 may have various devices which cannot be operated exclusively manually, but require a further power supply, tool cart 7 may be connected to a power supply (not shown) of packaging machine 2 and/or work station 1. Tool cart 7 may have a coupling device 18 for this purpose. It may be connectable to a port 19 which may be provided at work station 1 and/or at packaging machine 2. It may be in particular a compressed air port which may be usable with a pneumatic coupling, as in the present embodiment.

An embodiment of the method according to the invention shall now be described below with reference to FIGS. 1A to 1E. From an initial position shown by way of example in FIG. 1A, tool cart 7 may be aligned horizontally relative to the work station and/or the packaging machine, for example, by an operator. Tool cart 7 may be locked horizontally relative to work station 1 and/or packaging machine 2 in the correctly aligned position shown by way of example in FIG. 1B. For this purpose, a locking device 20 (see FIG. 2) may be provided.

Figure 1C:
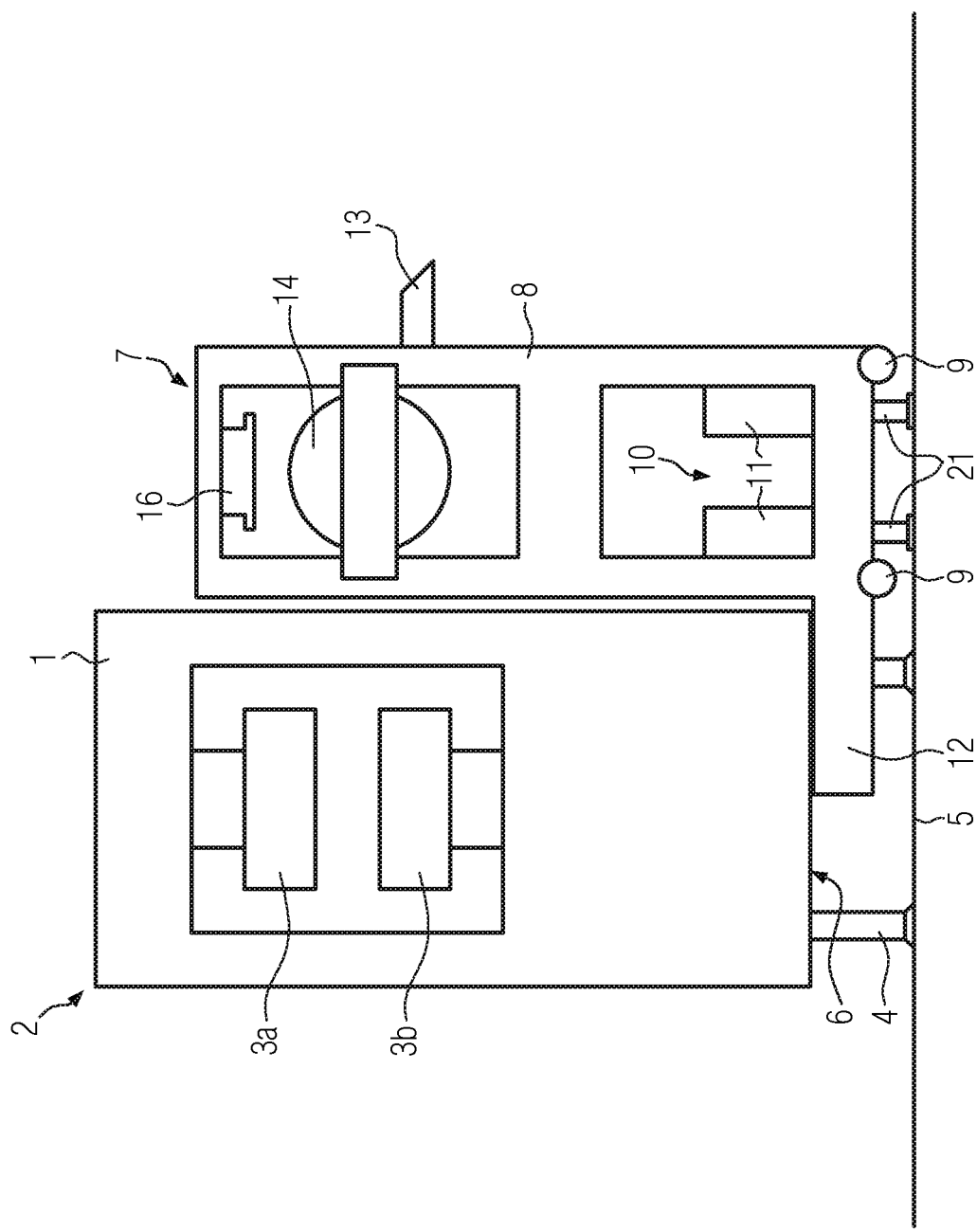
FIG. 1C is a schematic view of the embodiment of a packaging machine and the embodiment of a tool cart of FIG. 1A at another phase of an exemplary method.

Frame 8 of tool cart 7 may be lifted relative to installation surface 5 by actuating lifting device 10. One exemplary lifted position is shown in FIG. 1C. Lifting may be effected by extending piston rods 21 of cylinders 11. As can be seen in FIG. 1C, rolling elements 9 may be lifted off installation surface 5 when frame 8 is lifted. Tool cart 7 may be lifted until stop element 12 engages with underside 6 of work station 1 and/or packaging machine 2. Due to the engagement between stop element 12 and underside 6, tool cart 7 may be aligned relative to work station 1 and/or packaging station 2. The operation of lifting device 10 may be actuated by controls 22 (see FIG. 3) provided on operating device 13.

Figure 1D:
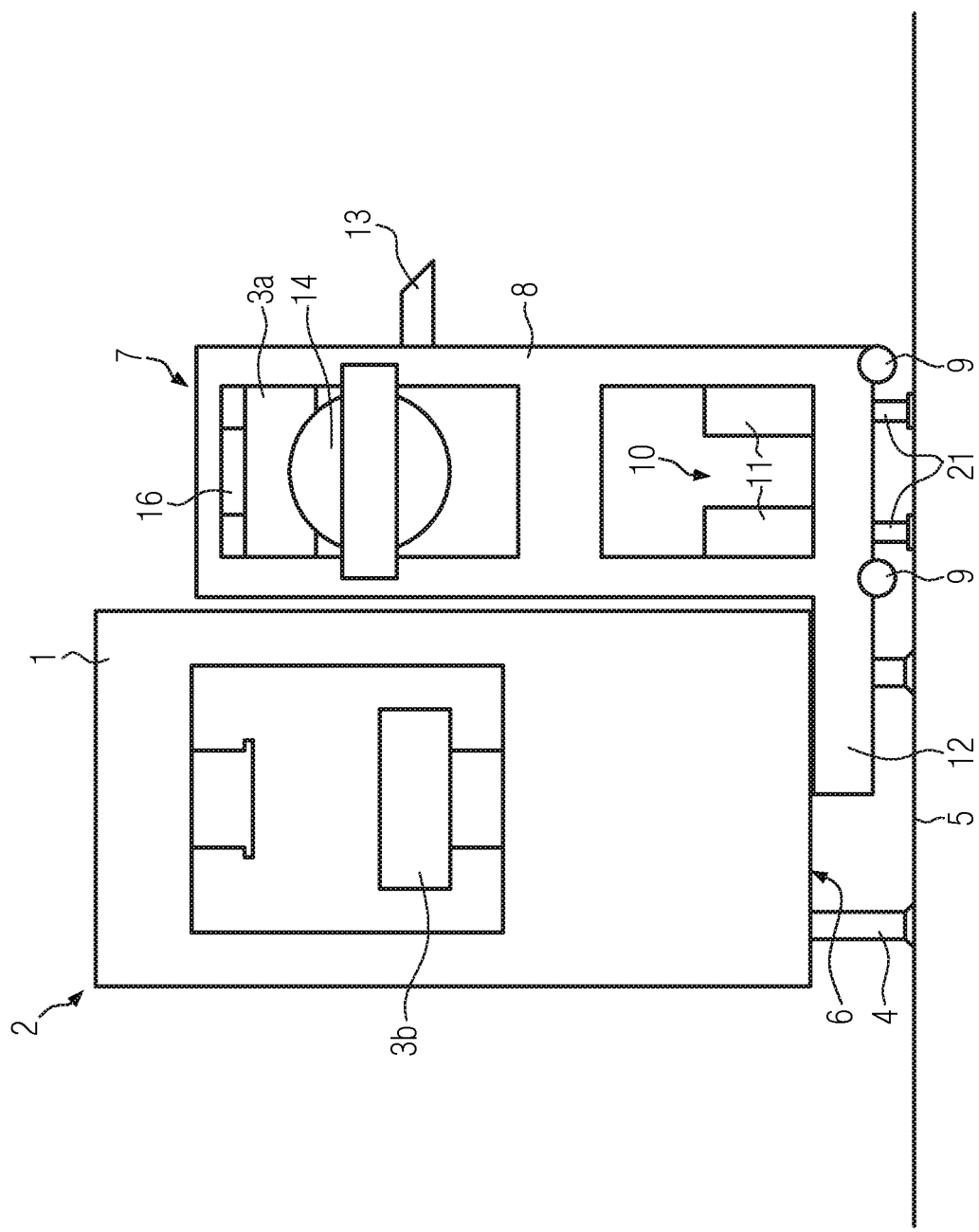
FIG. 1D is a schematic view of the embodiment of a packaging machine and the embodiment of a tool cart of FIG. 1A at another phase of an exemplary method.

When tool cart 7 is aligned both horizontally and vertically relative to work station 1 and/or packaging machine 2, first tool component 3a and/or second tool component 3b may be transferred between tool cart 7 and work station 1. Transferring between these two devices may be understood as being the removal from work station 1 and the reception in tool cart 7 as well as the removal from tool cart 7 and the reception in work station 1. FIG. 1D shows a representation in which first tool component 3a is received in tool cart 7. By lowering frame 8 of tool cart 7 and pushing it on rolling elements 9, first tool component 3a may now be moved to a storage, transported to another work station and/or packaging machine.

Figure 1E:
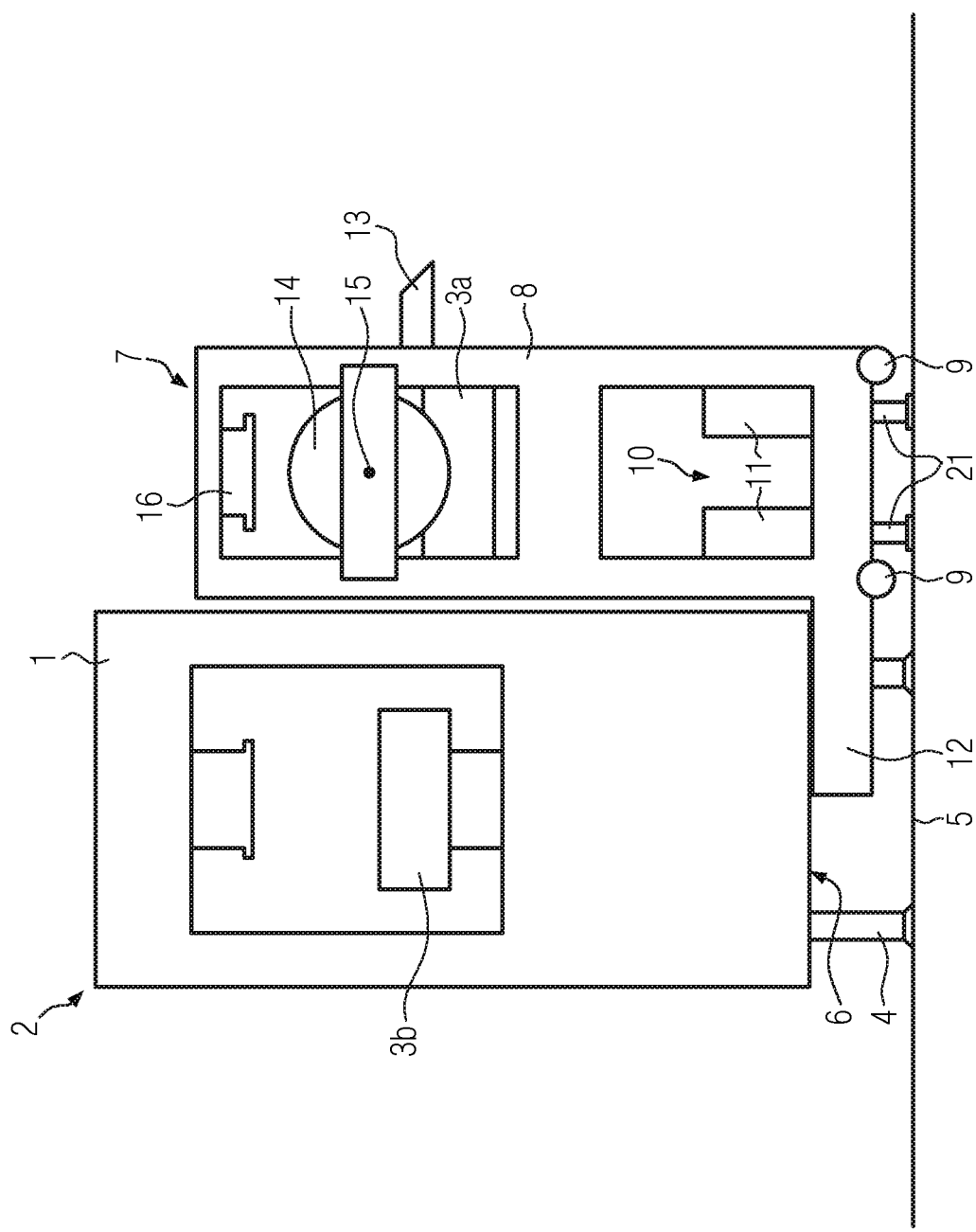
FIG. 1E is a schematic view of the embodiment of a packaging machine and the embodiment of a tool cart of FIG. 1A at another phase of an exemplary method.

In addition, it is conceivable that maintenance work for first tool component 3a is carried out still in the state received in tool cart 7. To facilitate this maintenance work, first tool component 3a may be pivoted about a horizontal axis 15 by first rotating device 14. First tool component 3a is shown in FIG. 1E in a state pivoted by 180° about horizontal axis 15. Other suitable pivot angles as desired by a person of skill in the art, such as an angle between 45° or 90°, or any other angle may have further advantages. Also pivoting about a vertical axis, for example, vertical axis 17 by second rotating device 16 may serve to facilitate maintenance work.

Figure 2:
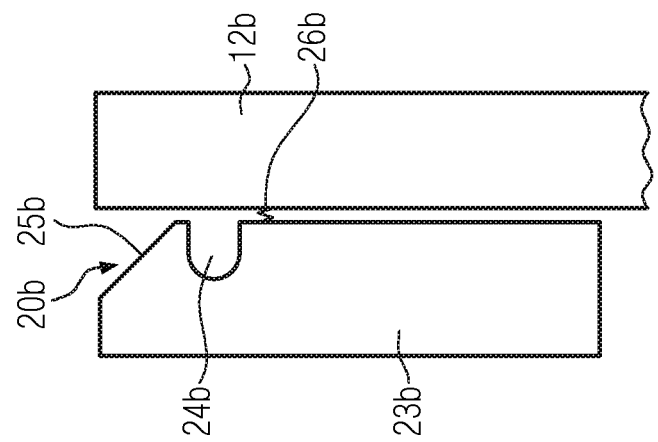
FIG. 2 shows a schematic top view of one embodiment of a stop element and one embodiment of a locking device of a tool cart method in accordance with the teachings of the present disclosure.
Figure 2:
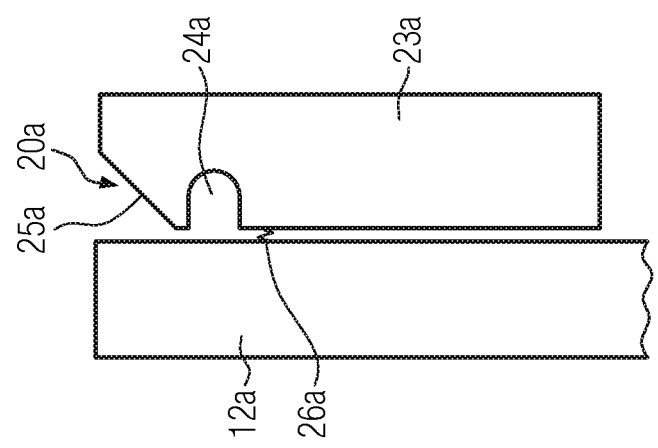

FIG. 2 shows a schematic representation of an exemplary locking device 20. The plane of the drawing of FIG. 2 runs parallel to underside 6 looking downwards in the direction toward installation surface 5. From this perspective, it may be seen that two stop elements 12a, 12b may be provided. It is also conceivable that two locking devices 20a, 20b are provided. Like in the embodiment illustrated, locking device 20a may interact with stop element 12a. The same may apply for locking device 20b and stop element 12b. In order to avoid repetition, the following explanation of the function relates only to locking device 20a, but is analogously applicable to locking device 20b.

Locking device 20a may comprise a pawl member 23a. Pawl member 23a may be movable relative to stop member 12a. In particular pivoting is conceivable. But also a linear motion is conceivable. Pawl member 23a may have an opening 24a. Opening 24a may be configured to receive one of supports 4. The option exists to lock alternatively pawl member 23a or generally locking device 20a to a different object than to machine support 4.

Furthermore, pawl member 23a may have a guide surface 25a. When pushing tool cart 7, guide surface 25a may be adapted to engage with one of supports 4 in an insertion direction R, so that pawl member 23a is moved until a gap exists between stop member 12a and pawl member 23a which enables support 4 to slide into opening 24a. A motion of pawl member 23a may be preloaded, for example, by a spring element 26a (not shown) in the direction of stop element 12a. Once pawl member 23a has snapped back into the starting position shown in FIG. 2 due to this preload, tool cart 7 is locked horizontally relative to work station 1 and/or packaging machine 2.

FIG. 3 shows a schematic representation of operating device 13 from the perspective indicated by arrows in FIG. 1A. It can be seen there that controls 22 may be provided in sections which are assigned to opposite ends of operating device 13 Controls 22 should be as far away from each other as possible so that they can only be operated by an operator using both hands.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for transferring a tool component between a work station of a packaging machine and a tool cart that is configured to receive said tool component, comprising the following steps:
   horizontally aligning a position of said tool cart relative to one of said work station or other portion said packaging machine;
   horizontally locking the position of said tool cart relative to one of said work station or said other portion of said packaging machine;
   vertically lifting a frame of said tool cart using a lifting device until a stop element of said tool cart abuts against an underside of one of said work station or said other portion of said packaging machine;
   aligning said tool cart vertically relative to one of said work station or said other portion of said packaging machine when said stop element abuts against said underside of one of said work station or said other portion of said packaging machine; and
   transferring said tool component between said tool cart and said work station;
   wherein the horizontal locking step occurs independently of the vertical lifting step.

2. The method according to claim 1, wherein the vertical lifting process is performed after the horizontal locking process has been executed.

3. The method according to claim 1, wherein the vertically lifting said frame step lifts one or more roller elements arranged on said frame off an installation surface of said packaging machine.

4. The method according to claim 1, further comprising the step of controlling said lifting device in one of an open-loop or a closed-loop manner such that said frame does not lower during the transfer of said tool component.

5. A tool cart for receiving a tool component of a work station of a packaging machine, wherein said tool cart comprises:
   a frame;
   one or more roller elements disposed on said frame;
   a lifting device disposed to lift said frame between a lowered position and a raised position wherein said lifting device is capable to lift said one or more roller elements off an installation surface of said packaging machine while lifting said frame;
   a locking device disposed to lock said tool cart horizontally relative to one of said work station or other portion of said packaging machine, wherein said lifting device and said locking device are operable independently of each other; and
   a stop element disposed to engage an underside of one of said work station or said other portion of said packaging machine when said frame is lifted in the raised position.

6. The tool cart according to claim 5, further comprising a coupling device which is connectable to a port of one of said work station or said packaging machine.

7. The tool cart according to claim 5, wherein said lifting device comprises a cylinder.

8. The tool cart according to claim 7, wherein said cylinder is a pneumatic cylinder.

9. The tool cart according to claim 5, further comprising a rotating device capable to rotate said tool component received by said tool cart about at least one of a horizontal axis and a vertical axis.

10. The tool cart according to claim 9, wherein at least one of said tool cart and said rotating device is adjustable and capable to be adapted to different work stations and/or packaging machines and/or tool components without tools.

11. The tool cart according to claim 5, further comprising an operating device capable to operate said lifting device and capable to be operated by an operator using both hands.

12. The tool cart according to claim 5, wherein said locking device is capable to engage with one of said work station or said other portion of said packaging machine below said underside of one of said work station or said other portion of said packaging machine.

13. The tool cart according to claim 5, wherein said frame of said tool cart is capable to be lifted in the horizontally locked state of said tool cart.

14. A tool cart for receiving a tool component of a work station of a packaging machine, the tool cart comprising:
   a frame;
   a lifting device disposed to lift the frame between a lowered position and a raised position; and a locking device disposed to lock the tool cart horizontally relative to one of the work station or other portion of the packaging machine;

wherein the lifting device and the locking device are operable independently of each other, and wherein the frame is capable to be lifted in the horizontally locked state of the tool cart.

15. The tool cart according to claim 14, further comprising one or more roller elements disposed on the frame, wherein the lifting device is operable to lift the one or more roller elements off an installation surface of the packaging machine while lifting the frame.

16. The tool cart according to claim 14, further comprising a rotating device configured to rotate the tool component received by the tool cart about at least one of a horizontal axis or a vertical axis.

17. The tool cart according to claim 16, wherein the rotating device is adjustable and capable to be adapted to different work stations and/or packaging machines and/or tool components without tools.

18. The tool cart according to claim 14, further comprising an operating device capable to operate the lifting device and capable to be operated by an operator using both hands.

19. The tool cart according to claim 14, wherein the locking device is configured to engage with one of the work station or the other portion of the packaging machine below an underside of one of the work station or the other portion of the packaging machine.

* * * * *